May 3, 1966  H. T. O'REILLY  3,249,182
SELF-ENERGIZING, INTERNALLY EXPANDING BRAKE
Filed June 6, 1963  3 Sheets-Sheet 1

INVENTOR
HUGH T. O'REILLY,

BY
Burns, Doane, Benedict, Swecker & Mathis
ATTORNEYS

May 3, 1966 H. T. O'REILLY 3,249,182
SELF-ENERGIZING, INTERNALLY EXPANDING BRAKE
Filed June 6, 1963 3 Sheets-Sheet 2
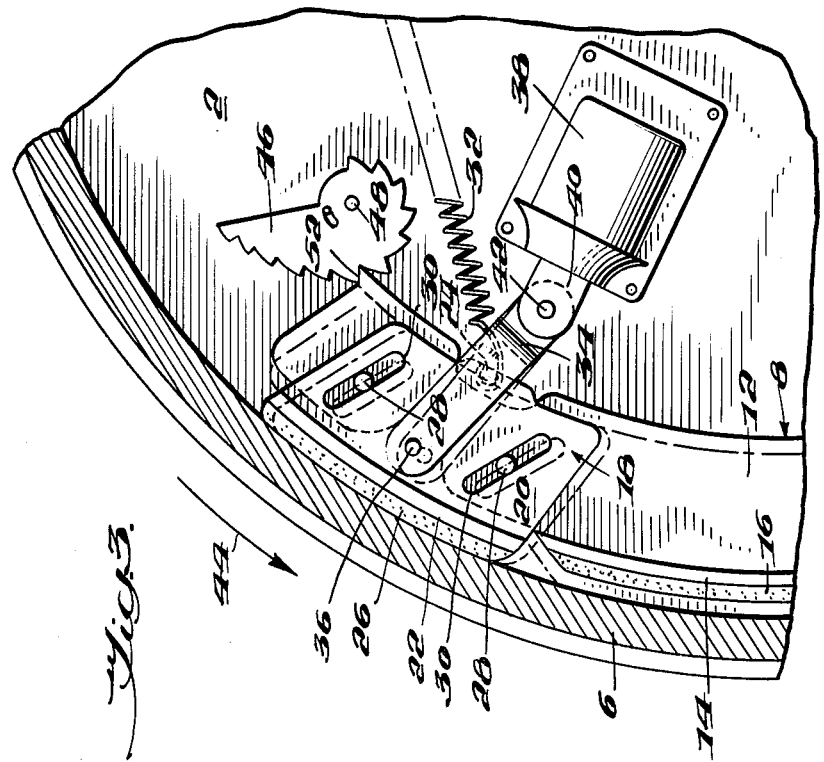
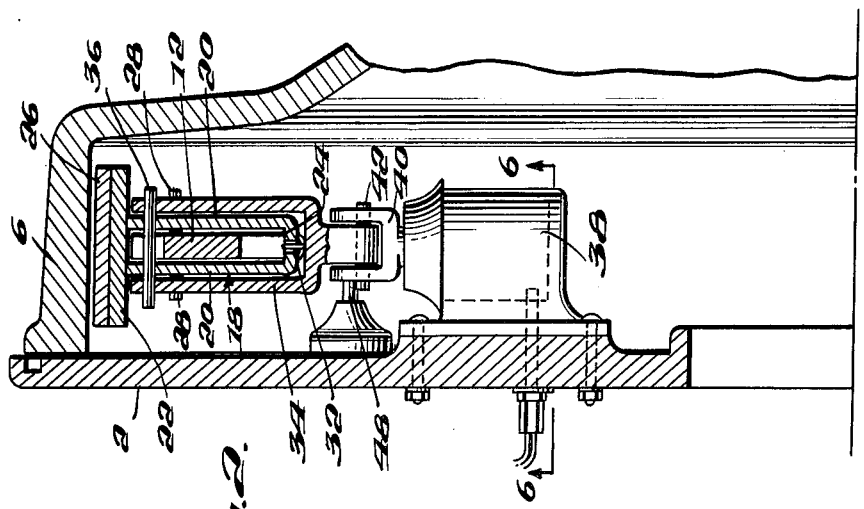
INVENTOR
HUGH T. O'REILLY,
BY
Burns, Doane, Benedict, Swecker + Mathis
ATTORNEYS

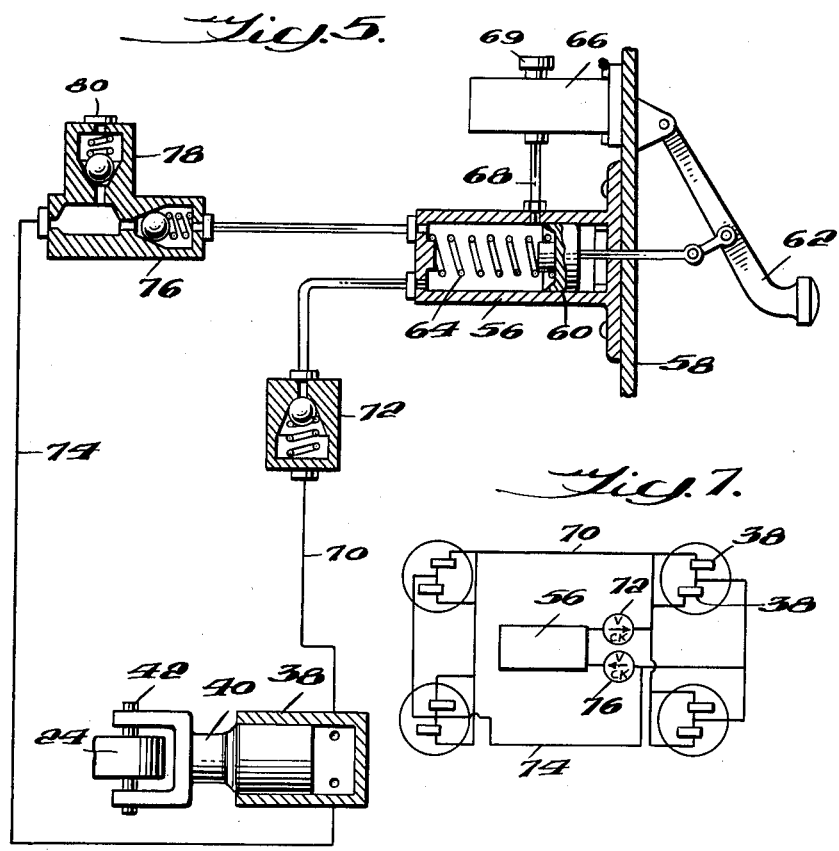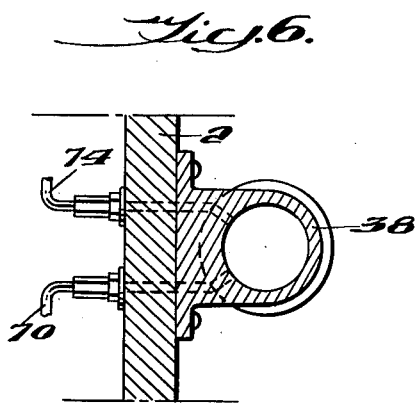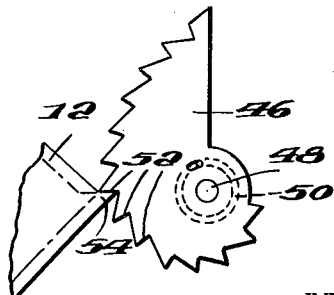

United States Patent Office 3,249,182
Patented May 3, 1966

3,249,182
SELF-ENERGIZING, INTERNALLY EXPANDING BRAKE
Hugh T. O'Reilly, 4205 Woodacre Drive, McLean, Va.
Filed June 6, 1963, Ser. No. 285,937
9 Claims. (Cl. 188—78)

This invention relates to brakes and more particularly to an anti-locking hydraulic brake system.

Modern vehicles have relatively small wheels, and therefore have small brake drums. When the brake lining is applied against the brake drum, friction generates heat within the brake drum. Due to the small size of the brake drums, the heat cannot be dissipated rapidly. Conventional vehicle brakes are operated by hydraulic pressure transmitted by brake fluid from a master cylinder for expanding pistons in the wheel cylinders. The wheel cylinders are located within the brake drum, adjacent the brake linings and therefore are exposed to the high temperature conditions.

It has been found that conventional brake fluid has a tendency to vaporize at temperatures which may be encountered in the brake drums under ordinary operating conditions of the brakes. When the brake fluid vaporizes, bubbles of vapor form in the fluid, so that when the fluid in the master cylinder is compressed to apply the brakes, the pressure increase in the fluid may be absorbed by compression of the vapor bubbles and the pressure of the fluid in the wheel cylinders is not increased. As a result, the brakes are "spongy."

In conventional brake systems, brake fluid is supplied from the master cylinder to each wheel cylinder through a single conduit. When the brake pedal is depressed, fluid is pumped from the master cylinder toward each wheel cylinder to expand the piston and apply the brakes. When the brake pedal is released, the fluid flows from the wheel cylinder back through the conduit toward the master cylinder. As a result, the fluid nearest the wheel cylinder in the brake conduit is constantly exposed to the high temperatures at the wheel, and vaporization of the brake fluid occurs, causing the brakes to be non-responsive.

Another problem encountered in brake assemblies is locking of self-energizing brakes. Conventional drum brake assemblies include a curved brake shoe pivoted at one end and having a hydraulic wheel cylinder at the opposite end of the shoe to swing the brake shoe against the brake drum. The curvature of the brake lining is approximately the same as that of the brake drum to provide maximum surface contact between the lining and the drum. The brake shoes are mounted so that as the vehicle moves forward, rotation of the drum proceeds from the wheel cylinder and of the brake shoe, or "toe," to the pivoted end, or "heel," and since the heel of the brake shoe is spaced inside of the brake drum, pivoting movement of the brake shoe toward the drum causes a wedging effect against the drum. The greater the speed of rotation of the drum, the greater the self-energizing force urging the brake lining into engagement with the drum. Under severe braking conditions, the brake shoes of this type, commonly called "leading" shoes become so tightly wedged against the drum, that the lining and the drum become locked together and the wheel skids.

If the brake shoe is reversed, so that, as the vehicle moves forward, the drum rotation proceeds from the heel, where the brake shoe is pivoted, to the toe, there is no self-energizing effect and consequently the tendency of the brakes to lock is much less than with leading shoes. The advantage of self-energizing brakes, however, is to reduce the force required on the brake pedal to actuate the brake shoe. Trailing shoes, therefore, are unsatisfactory substitutes for self-energizing brakes, although the self-energizing, leading shoe type brakes may cause wheel lock and uncontrolled skidding of the wheels.

Accordingly, it is an object of this invention to provide an improved hydraulic brake system.

It is another object of this invention to prevent vaporization of brake fluid in the wheel cylinders.

It is a further object of this invention to provide a self-energizing brake which does not become locked.

It is a still further object of this invention to provide a brake in which the linings are adjusted for drum clearance automatically.

These objects are accomplished in accordance with a preferred embodiment of the invention by a brake system in which a wheel cylinder is connected to a master cylinder by independent supply and return conduits. A check valve in the supply conduit permits fluid to flow only from the master cylinder toward the wheel cylinder and a check valve in the return conduit permits fluid to flow only from the wheel cylinder to the master cylinder. Thus, upon operation of the master cylinder, brake fluid is circulated through the wheel cylinder. The piston of the wheel cylinder operates a compound brake shoe having a primary, leading brake shoe, which is self-energizing, and a secondary brake shoe which cooperates with the primary shoe. The secondary brake shoe is provided with cam slots which engage trunnions on the primary brake shoe. The secondary brake shoe is mounted on the primary brake shoe so that when the piston of the wheel cylinder is displaced radially, the secondary brake shoe slides along the trunnions to engage the brake drum and then is carried along by the friction force of the rotating brake drum to cam the primary brake shoe into engagement with the drum.

A spring loaded adjuster is engaged by the primary brake shoe. The adjuster is mounted on a stationary support and by means of gear teeth of graduated depth, the distance between the primary brake shoe and the brake drum is automatically adjusted. The adjuster also serves as an anchor against which the primary shoe bears when the secondary shoe is actuated during reverse rotation of the brake drum.

This preferred embodiment of the invention is illustrated in the accompanying drawings in which:

FIG. 2 is an enlarged cross sectional view of the brake along the line 2—2 in FIG. 1;

FIG. 3 is an enlarged detail view of the brake showing the movements of the brake elements;

FIG. 4 is a detailed view of the automatic brake shoe adjuster;

FIG. 5 is a schematic view of the hydraulic brake system of this invention;

FIG. 6 is a cross sectional view of a wheel cylinder along the line 6—6 in FIG. 2; and FIG. 7 is a schematic view of the hydraulic system of this invention, as applied to a four wheeled vehicle.

Figure 1:
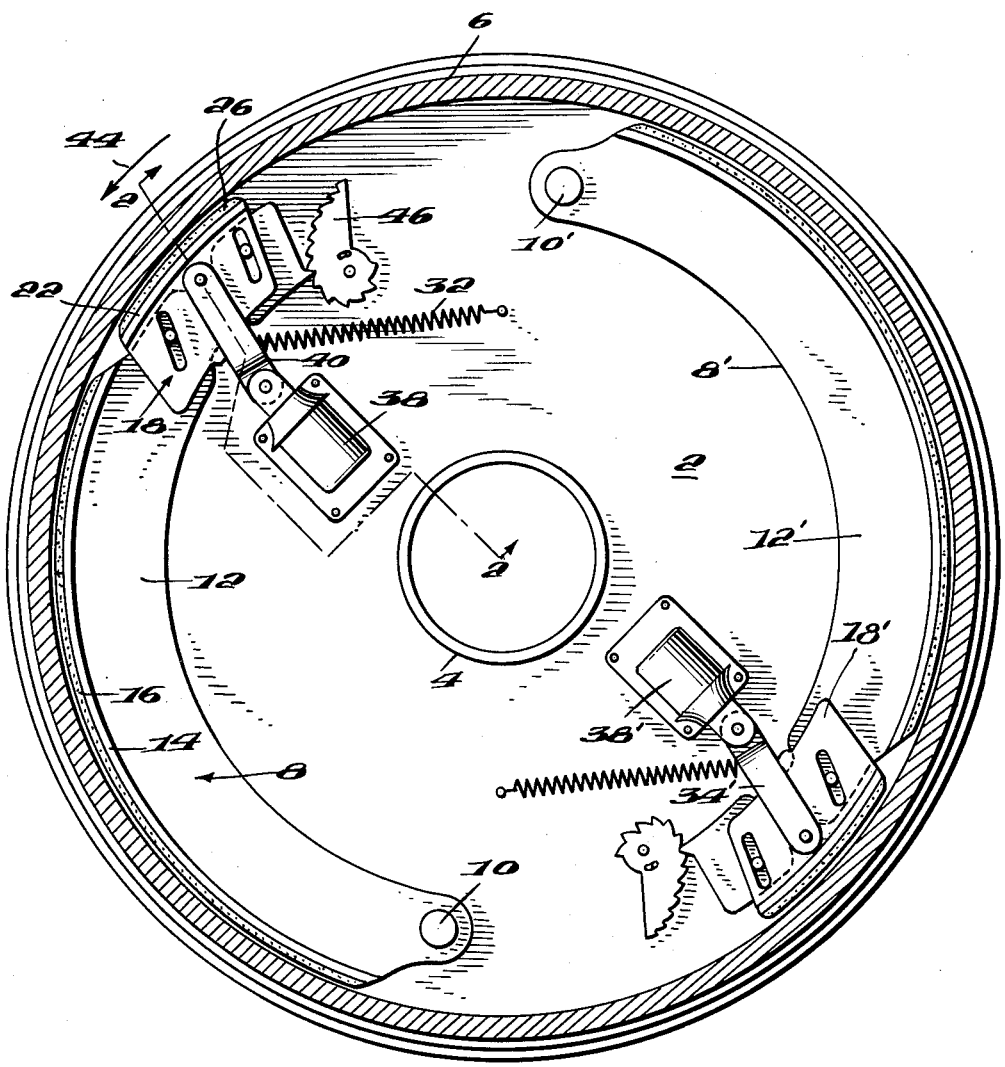
FIG. 1 is a schematic side elevational view of the brake shoes of this invention mounted on a brake supporting plate.

Referring to FIGS. 1 and 2, a brake support plate 2 is conventionally mounted on a vehicle and is provided with an opening 4 through which an axle extends. The axle arrangement for a steerable front wheel is slightly different than that of a rear wheel, but the support plate 2 is typical of left hand, front and rear wheels in the mounting of the brake shoes. A brake drum 6 is mounted on an axle for rotation relative to the support plate 2. The brake drum 6 also supports the wheel, but the axle assembly is not shown in the drawings, since it is not a part of this invention.

A primary brake shoe 8 is mounted at one end for swinging movement on a post 10 extending outward from the support plate 2. The primary brake shoe 8 has a longitudinal rib 12 which is provided with an outer flange 14. A conventional brake lining 16 is secured to the flange 14 by rivets or other conventional means. The flange 14 has approximately the same radius of curvature as the interior circumference of the brake drum 6 to provide the maximum area of contact between the brake lining 16 and the brake drum 6. Conventional means may be provided to prevent canting of the brake shoe 8.

The flange 14 does not extend the full length of the rib 12 and a secondary shoe 18 is mounted on the rib 12 between the end of the flange 14 and the end of the rib 12. The secondary shoe 18 is in the form of a channel having opposite side walls 20 which are secured along one edge to a flange 22, and a tab 24 connects the opposite edge of each side wall 20. Brake lining material 26 is fastened securely to the flange 22.

A pair of trunnions 28 are secured to the rib 12 and extend outward on opposite sides of the rib. Each of the trunnions 28 extends through slots 30 in each of the side walls 20. The slots 30 are parallel and extend in angular relation to the radius of curvature of the rib 12. The opposite sides of the slots fit closely against the trunnions, without binding, to form cam surfaces for displacing the primary brake shoe 8.

A spring 32 is connected at one end to the tab 24 on the secondary shoe 18. The opposite end of the spring is secured to the support plate 2. The spring is arranged so that it leads the slots relative to the trunnions 28 and urges the secondary shoe 18 and the primary shoe 8 away from the brake drum.

A fork link 34 having arms extending on opposite sides of the secondary shoe 18 is connected to the shoe 18 by a pin 36 which extends through the arms of the link 34 and the side walls 20. The pin 36 is positioned as close to the flange 22 as is practical in order to lead the shoe into position and thereby to prevent binding of the trunnions 28 and the slots 30 and uneven contact between the brake drum 6 and the lining 26. A hydraulic wheel cylinder 38 is secured to the support plate 2 and a piston 40 in the wheel cylinder 38 has a clevis formed thereon. A pin 42 extends through the clevis and the fork link 34 for reciprocation of the fork link by the piston 40.

The brake shoes 8 and 18 are arranged relative to the support plate 2, so that for either right or left wheels the primary shoe is a leading shoe and the drum rotates in the direction of the arrow 44 as the vehicle moves forward.

The clearance between the primary shoe 8 and the drum 6 is adjusted automatically by a snail gear 46 which is shown in detail in FIG. 4. The gear 46 is mounted for rotation on a post 48 secured to the support plate 2. A coil spring 50 is connected at one end to the support plate 2 and at the opposite end to the snail gear 46. The spring 50 urges the gear in counterclockwise rotation. The teeth of the gear 46 have radial faces 52. The radius of each of the gear faces 52 from the center of the post 48 to the root of the gear face is approximately one-half the depth of the tooth greater than the root radius of the preceding tooth. The end of the rib 12 has a gear tooth 54 formed thereon in position to engage the gear teeth of the snail gear 46. When the brakes are applied, the rib 12 moves away from the post 48 along the face 52 of the gear and the depth of the face 52 is slightly greater than the desired radial clearance between the primary brake shoe 8 and the drum 6. As the brake lining 16 wears, the clearance increases, so that eventually the tooth 54 moves radially outward over the end of the face 52 and the spring 50 rotates the snail gear counterclockwise, so that the tooth 54 engages the next gear face 52. In this manner, the clearance between the primary shoe 8 and the drum is maintained substantially within the limits of the depth of the gear face 52.

As shown in FIG. 1, the rearward brake assembly which is also mounted on the support plate 2, has substantially the same structure as the forward assembly. A primary shoe 8' is pivotally mounted on a post 10' and a secondary shoe 18' is mounted on the rib 12' of the primary shoe 8'. A wheel cylinder 38' is connected to the secondary shoe 18' through a fork link 34' for operation of the brake in the same manner as the forward brake shoe assembly.

The operation of the brake shoes of this invention is shown in detail in FIG. 3. The primary shoe 8 is shown in full lines in the retracted position. When the brakes are applied, the piston 40 moves outward from the cylinder 38. The fork link 34 transmits the movement of the piston 40 to the secondary shoe 18, causing it to move radially from the position shown in FIG. 1 to the full line position shown in FIG. 3. In the applied position the lining 26 engages the surface of the drum 6 uniformly.

When the vehicle is moving forward, the drum 6 is rotating in the direction of the arrows 44 in FIGS. 1 and 3. Therefore, the engagement of the secondary shoe 18 with the drum 6 imposes a tangential friction force on the shoe 18 and the shoe 18 moves from the full line position to the dotted line position shown in FIG. 3. The tangential friction force is transmitted to the trunnions 28 by the slots 30 and the displacement of the secondary shoe 18 causes the slots to cam the trunnions radially outward and thereby to swing the primary shoe 8 into engagement with the drum.

If the brakes should begin to lock, so that the drum 6 stops its rotation, the tangential friction force on the secondary shoe is reduced and the spring 32 is sufficiently strong to move the shoe 18 back to the full line position shown in FIG. 3. This movement cams the trunnions 28, and therefore the primary shoe 8, to the retracted position in which the tooth 54 on the rib 12 engages the root of the tooth 52 on the snail gear. Consequently, at the time of an incipient skid, the primary brake shoe 8 is automatically released sufficiently for the wheel to continue rotation and then is applied again until the vehicle has stopped moving.

When the vehicle is moving backward, the drum 6 rotates in the direction opposite to the arrow 44. When the brakes are applied and the piston 40 moves outward from the cylinder 38, the work link 34 transmits this motion to the secondary shoe 18 to move it to the position shown in full lines in FIG. 3. The friction force imposed on the secondary shoe is in the direction of rotation of the drum 6. The slots 30 therefore impose a force on the trunnions 28 which urges the rib 12 against the snail adjuster gear 46. Since the post 48 is stationary, the trunnions 28 do not move and a component of the friction force urges the secondary shoe 18 against the drum. Therefore, in reverse, the primary shoe 8 does not engage the drum, but the secondary shoe 18 is self-energizing. The smaller braking area available for braking backward movement of a vehicle is practical since the secondary shoe is self-energizing in reverse and vehicles travel only at slow speeds in reverse.

The hydraulic system for operating the wheel cylinder 38 is shown in FIGS. 5 to 7. As shown in FIG. 5, a master cylinder 56 is mounted on the firewall 58 of the vehicle. The cylinder 56 is provided with a piston 60, which is connected with a conventional brake pedal 62. The piston 60 is urged toward its retracted position by a spring 64 in the cylinder 56. A reservoir 66 for containing a supply of brake fluid is connected with the master cylinder by a conduit 68 through an opening in the wall of the master cylinder 56 immediately in front of the piston 60, when it is in its retracted position. The reservoir 66 is provided with a removable, vented cap 69 covering the filling opening.

A brake fluid conduit 70 communicates between the end of the master cylinder 56 and the brake cylinder 38 for supplying brake fluid to displace the piston 40. A check valve 72 in the supply conduit 70 permits the flow of brake fluid only toward the brake cylinder 38. A fluid return conduit 74 communicates between the brake cylinder 38 and the interior of the master cylinder 56. As shown in FIG. 6, the supply conduit 70 and the return conduit 74 communicate with the interior of the cylinder 38 on opposite sides of the cylinder, so that the fluid flows across the cylinder from the supply conduit 70 to the return conduit 74. A check valve 76 in the return conduit 74 permits only the flow of fluid from the cylinder 38 to the interior of the master cylinder 56. A brake fluid bleed valve 78 is also provided in the return conduit 74. The bleed valve includes a screw cap 80 covering the opening through which the brake fluid is bled.

When the brake pedal 62 is depressed, the piston 60 advances in the cylinder 56 and closes off communication between the interior of the cylinder 56 and the conduit 68. Continued depression of the pedal 62 compresses the fluid in the cylinder 56 until the fluid pressure is sufficient to overcome the force of the spring 32, at which time the fluid flows through the check valve 72 into the wheel cylinder 38 to expand the piston 40. The fluid does not flow in the return conduit 74, since the pressure of the fluid in the master cylinder 56 urges the check valve 76 to a closed position. When the brake pedal 62 is released, the piston 60 travels back to its retracted position, thereby reducing the pressure in the master cylinder 56. The return spring 32 (FIG. 1) urges the piston 40 toward its retracted position in the wheel cylinder 38 and brake fluid flows through the return conduit 74 and through the check valve 76. The check valves and the return spring cause the brake fluid to flow in only one direction through the brake system. Heat transferred to the brake fluid in the wheel cylinder 38 is thereby dissipated as the fluid flows through the return line 74 and cool brake fluid flows into the wheel cylinder 38 through the conduit 70. The disposition of the ports in the wheel cylinder 38, as shown in FIG. 6, provides circulation of fluid within the cylinder between the supply conduit 70 and the return conduit 74. As a further precaution against the accumulation of vapor in the fluid, vapor bubbles will rise to the top of the fluid in the master cylinder 56 and flow through the vertical conduit 68 into the reservoir 66, when the piston 60 is in its retracted position. A manual bleed valve 78 permits the brake fluid to be bled merely by removing the cap 80 and depressing the pedal 62, so that the fluid flows through the return line 74 and out through the bleed check valve 78.

The brake fluid circuit shown in FIG. 5 includes only a single wheel cylinder 38, but as shown in FIG. 1, each wheel is provided with two wheel cylinders and to minimize the amount of tubing or conduit required, a brake system connecting the four wheels of the vehicle, in accordance with this invention may be arranged as shown in FIG. 7. Fluid flows from the master cylinder 56 through the check valve 72, the supply conduit 70, through each of the eight wheel cylinders 38, through the return conduit 74 and its check valve 76 and into the master cylinder 56. Each of the wheel cylinders 38 is connected in the circuit in parallel with each of the other wheel cylinders and any number of wheel cylinders may be included in the circuit.

In operation, when the pedal 62 is depressed, each wheel cylinder 38 receives brake fluid from the master cylinder 56, thereby causing the piston 40 to expand out of the wheel cylinder 38. This is transmitted to the secondary shoe 18 by the fork link 34 and the secondary shoe engages the brake drum 6. If the drum is rotating in the direction of the arrow 44 in FIGS. 1 and 3, then the secondary shoe 18 is displaced longitudinally along the rib 12 and the slots 30 impose a radial force on the trunnions 28 and consequently on the rib 12 to swing the primary brake shoe 8 counterclockwise about the pivotal mounting post 10 and into engagement with the brake drum 6. The primary brake shoe 8 is of the self-energizing type and if, under severe braking conditions, the brake should approach a locked condition, so that skidding would occur, the brake drum 6 stops rotating relative to the brake lining 26 of the secondary shoe 18. Since there is no longer a frictional force urging the slots 30 against the trunnions 28, the spring 32 retracts the secondary shoe 18 and due to the angular orientation of the slots 30 and the fork link 34, the primary brake shoe is retracted by the trunnions 28 away from the drum to permit the brake to be released sufficiently for the drum to begin rotation and when this occurs, the slots 30 of the secondary shoe 18 are again displaced against the trunnion 28 to apply the primary brake shoe to the drum. By means of this arrangement, the brake assembly prevents skidding, but provides the maximum braking force to the wheel up to the point of skidding. Since the brake is automatically released, uncontrolled skidding cannot occur.

When the brake pedal 62 is released, the fluid pressure in the master cylinder 56 is reduced and the brake fluid flows out of the wheel cylinder 38 through the return line 74, whereby it is cooled and the heat in the fluid is dissipated so that vapor bubbles do not form.

As the friction material wears off of the primary shoe 8, the tooth 54 on the rib 12 rides over successive teeth 52 of the snail adjuster gear 46. Since the depth of each tooth 52 is slightly greater than the desired clearance between the retracted brake lining 16 and the drum 6 and the pitch radius of each tooth is one-half the depth of a tooth greater than the preceding tooth, the spring loaded gear 46 rotates to adjust the clearance of the primary brake shoe. Since the secondary shoe 18 is mounted on the primary shoe 8, its clearance is adjusted along with the primary shoe 8 by the gear 46. The outward movement of the piston 40 is limited by the secondary shoe engaging the drum 6 and the inward movement is limited by the tooth 54 of the rib 12 engaging the gear 46. Therefore the piston 40 automatically compensates for the brake lining clearance adjustment as the linings are worn away.

The brake system of this invention eliminates several of the hazards encountered in the conventional wheel drum brakes, since it prevents uncontrolled skidding of the wheels during severe braking and prevents the formation of vapor bubbles in the fluid due to excessive heat within the brake drum. The brake system of this invention also improves the safety characteristics of brakes, since the brakes may be applied to exert the maximum braking force, without fear of skidding the wheels, as would occur often with conventional brake assemblies.

While this invention has been illustrated and described in accordance with the preferred embodiment, it is recognized that variations and changes may be made therein without departing from the invention as set forth in the claims.

I claim:

1. In a vehicle wheel brake of the type having a rotating brake drum and a stationary brake support, a brake actuating device comprising a first brake shoe extending along a portion of the circumference of the brake drum and having one end thereof mounted for pivoting movement on the support, a second brake shoe, means mounting the second brake shoe solely on the first brake shoe at the end opposite the pivotal mounting, means for selectively urging the second brake shoe radially against the brake drum, means on the second brake shoe for engaging a portion of the first brake shoe, means for displacing the first shoe against the brake drum upon movement of the second shoe toward said pivotal mounting, and means for displacing the first brake shoe away from the drum upon movement of the second shoe away from the pivotal mounting whereby upon movement of the second shoe against the rotating drum by the urging means, the second shoe is displaced tangentially against said portion of the first brake shoe to cam the first shoe against the drum.

2. In a vehicle wheel brake of the type having a rotating brake drum and a stationary brake support, a brake actuating device comprising a first brake shoe extending along a portion of the circumference of the brake drum and having one end thereof mounted for pivoting movement on the support, a second brake shoe, means mounting the second brake shoe solely on the first brake shoe at the end opposite the pivotal mounting, abutment means on the first brake shoe adjacent the second shoe, cam means on the second brake shoe in position to engage the abutment means, said cam means and abutment means being in position to displace said first shoe toward the brake drum upon movement of said second shoe toward said pivotal mounting and to displace said first shoe away from the brake drum upon movement of said second shoe away from said pivotal mounting, a fluid cylinder mounted on the support and having a piston therein, means connecting the piston with the second shoe and spring means for urging said second brake shoe away from the pivotal mounting whereby upon movement of the second shoe against the rotating drum by the urging means, the second shoe is displaced tangentially against the abutment means to cam the first shoe against the drum.

3. In a vehicle wheel brake of the type having a rotating brake drum and a stationary brake support, a brake actuating device comprising a first brake shoe extending along a portion of the circumference of the brake drum and having one end thereof mounted for pivoting movement on the support, a second brake shoe, said first shoe having a longitudinal rib portion on the end opposite the pivotal mounting, means mounting said second shoe solely on said first shoe and in overlapping relation on the rib portion, said second shoe having slots therein, trunnions on the first shoe and extending into the slots in the second shoe, said slots being arranged for urging the first shoe toward the drum upon longitudinal movement of the second shoe relative to the first shoe toward said pivotal mounting and urging said first shoe away from the drum upon longitudinal movement of said second shoe away from said pivotal mounting, operating means connected with said second shoe between the slots for selectively urging the second brake shoe against the drum, and spring means yieldably resisting said longitudinal movement of the second shoe toward said pivotal mounting and radial movement of the second shoe, whereby said operating means moves said second shoe into engagement with said drum and upon rotation of the drum in a direction from the opposite end of the first shoe toward the pivotal mounting thereof said second shoe is displaced longitudinally against the trunnions thereby displacing the first shoe radially into engagement with the drum.

4. In a vehicle wheel brake of the type having a rotating brake drum and a stationary brake support, a brake actuating device comprising a first brake shoe extending along a portion of the circumference of the brake drum and having one end thereof mounted for pivoting movement on the support, a second brake shoe, said first shoe having a longitudinal rib portion on the end opposite the pivotal mounting, means mounting said second shoe solely on said first shoe between the ends thereof and in overlapping relation on the rib portion, said second shoe having slots therein, trunnions on the first shoe and extending into the slots in the second shoe, said slots extending in angular relation to a radius of the drum, operating means connected with said second shoe between the slots and the brake drum for selectively urging the second brake shoe against the drum, spring means connected between the support and the second shoe for yieldably resisting displacement of the second shoe relative to the drum, and means on the support for limiting pivoting movement of the first shoe away from the drum whereby upon movement of the second shoe into engagement with the drum, rotation of the drum in one direction causes pivoting of the first shoe against the drum and rotation of the drum in the opposite direction causes pivoting of the first shoe against the limiting means thereby wedging the second shoe against the drum.

5. In a vehicle wheel brake of the type having a rotating brake drum and a stationary brake support, a brake actuating device comprising a first brake shoe extending along a portion of the circumference of the brake drum and having one end thereof mounted for pivoting movement on the support, a second brake shoe, said first shoe having a longitudinal rib portion on the end opposite the pivotal mounting, means mounting said second shoe solely on said first shoe and in overlapping relation on the rib portion, said second shoe having slots therein, trunnions on the first shoe and extending into the slots in the second shoe, said slots urging the first shoe toward the drum upon longitudinal movement of the second shoe relative to the first shoe toward said pivotal mounting and urging said first shoe away from the drum upon longitudinal movement of said second shoe away from said pivotal mounting, a fluid cylinder mounted on the support and having a piston therein, bearing means on the second shoe adjacent the drum and between the slots, said piston being movable toward the drum, link means between said piston and said bearing means, and spring means yieldably resisting said longitudinal movement of the second shoe toward said pivotal mounting and radial movement of the second shoe, whereby said piston moves the second shoe into engagement with said drum and upon rotation of the drum in a direction from the opposite end of the first shoe toward the pivotal mounting thereof said second shoe is displaced longitudinally against the trunnions thereby displacing the first shoe radially into engagement with the drum.

6. In a vehicle wheel brake of the type having a rotating brake drum and stationary brake support, a brake actuating device comprising a first brake shoe extending along a portion of the circumference of the brake drum and having one end thereof mounted for pivoting movement on the support, a second brake shoe, said first shoe having a longitudinal rib portion on the end opposite the pivotal mounting, means mounting said second shoe solely on said first shoe and in overlapping relation on the rib portion, said second shoe having slots therein, trunnions on the first shoe and extending into the slots in the second shoe, said slots urging the first shoe toward the drum upon longitudinal movement of the second shoe relative to the first shoe toward said pivotal mounting and urging said first shoe away from the drum upon longitudinal movement of said second shoe away from said pivotal mounting, a fluid cylinder mounted on the support and having a piston therein, a pin extending through the second shoe adjacent the drum and between the slots, a bifurcated link, the bifurcations of said link engaging the opposite ends of the pin and the opposite end of said link being connected to the piston and, a spring having one end secured to the brake support and the opposite end secured to the link, said spring being in position for biasing said second shoe away from said pivotal mounting and said drum, whereby said piston moves the second shoe into engagement with said drum and upon rotation of the drum in a direction from the opposite end of the first shoe toward the piovtal mounting thereof said second shoe is displaced longitudinally against the trunnions thereby displacing the first shoe radially into engagement with the drum.

7. In a vehicle wheel brake of the type having a rotating brake drum and a stationary brake support, a brake actuating device comprising a first brake shoe extending along a portion of the circumference of the brake drum and having one end thereof mounted for pivoting movement on the support, a second brake shoe, said first shoe having a longitudinal rib portion on the end opposite the pivotal mounting, means mounting said second shoe solely on said first shoe and in overlapping relation on the rib portion, said second shoe having slots therein, trunnions on the first shoe and extending into the slots in the second shoe, said slots being oriented to displace the first shoe toward the drum upon longitudinal movement of the second shoe relative to the first shoe toward said pivotal mounting and urging said first shoe away from the drum upon longitudinal movement of said second shoe away from said pivotal mounting, a fluid cylinder mounted on the support and having a piston therein, bearing means on the second shoe adjacent the drum and between the slots, said piston being movable toward the drum, a link extending between the piston and the bearing means, said link being misaligned with said piston when said second shoe is spaced from the drum, and spring means yieldably urging the second shoe away from the drum and away from the pivotal mounting of the first shoe, whereby upon displacement of the piston toward the drum the link swings the second shoe relative to the first shoe and the second shoe cams the first shoe against the drum.

8. In a vehicle wheel brake of the type having a rotating brake drum and a stationary brake support, a brake actuating device comprising a first brake shoe extending along a portion of the circumference of the brake drum and having one end thereof mounted for pivoting movement on the support, a second brake shoe, said first shoe having a longitudinal rib portion on the end opposite the pivotal mounting, said second shoe being mounted solely on said first shoe and having side walls extending on opposite sides of the rib portion and a flange adjacent the drum, said side walls having slots therein, trunnions on the first shoe extending into said slots, a pin on one of said side walls adjacent the flange, a link journalled on the pin, a fluid cylinder mounted on the support and having a piston therein, means connecting the link to the piston, and spring means extending between said support and said second shoe, said spring being in position for biasing said second shoe away from said pivotal mounting and said drum, whereby upon displacement of the piston toward the drum, the link swings the second shoe relative to the first shoe and the second shoe cams the first shoe against the drum.

9. In a vehicle wheel brake of the type having a rotating brake drum and a stationary brake support, a brake actuating device comprising a first brake shoe extending along a portion of the circumference of the brake drum and having one end thereof mounted for pivoting movement on the support, a second brake shoe, said first shoe having a longitudinal rib portion on the end opposite the pivotal mounting, means mounting said second shoe solely on said first shoe and in overlapping relation on the rib portion, said second shoe having slots therein, trunnions on the first shoe and etxending into the slots in the second shoe, said slots being oriented to displace the first shoe toward the drum upon longitudinal movement of the second shoe relative to the first shoe in one direction and to displace the first shoe away from the drum upon longitudinal movement of the second shoe in the opposite direction, operating means connected with said second shoe between the slots for selectively moving the second brake shoe against the drum, and spring means yieldably resisting said longitudinal movement in said one direction and radial movement of the second shoe, whereby said operating means moves said second shoe into engagement with said drum and upon rotation of the drum in a direction from the opposite end of the first shoe toward the pivotal mounting thereof said second shoe is displaced longitudinally against the trunnions thereby displacing the first shoe radially into engagement with the drum.

References Cited by the Examiner

UNITED STATES PATENTS

| | | | |
|---|---|---|---|
| 1,953,660 | 4/1934 | Simon | 188—79.5 |
| 1,967,390 | 7/1934 | Bendix et al. | 188—74 |
| 1,972,288 | 9/1934 | Brewster | 188—78 X |
| 2,060,853 | 11/1936 | Carroll. | |
| 2,062,819 | 12/1936 | Perazzo et al. | 188—79 |
| 2,065,018 | 12/1936 | Oliver et al. | 188—152 |
| 2,255,260 | 9/1941 | Loweke | 188—19 |
| 2,355,827 | 8/1944 | Stelzer | 188—78 |
| 3,140,760 | 7/1964 | Rosmussen | 188—78 |
| 3,150,746 | 9/1964 | Rumpf | 188—79.5 |

MILTON BUCHLER, *Primary Examiner.*

EUGENE G. BOTZ, ARTHUR L. LA POINT,
*Examiners.*